US007792904B2

United States Patent
Balasubramanian

(10) Patent No.: US 7,792,904 B2
(45) Date of Patent: Sep. 7, 2010

(54) SHARING MATERIAL IN A MASTER-SLAVE CONFIGURATION USING AN INSTANT MESSAGING INFRASTRUCTURE

(75) Inventor: Swaminathan Balasubramanian, Sterling Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 12/014,497

(22) Filed: Jan. 15, 2008

(65) Prior Publication Data
US 2009/0182833 A1 Jul. 16, 2009

(51) Int. Cl.
G06F 15/16 (2006.01)
(52) U.S. Cl. .................. 709/205; 709/204; 709/208
(58) Field of Classification Search ......... 709/208–211, 709/204–205
See application file for complete search history.

(56) References Cited

U.S. PATENT DOCUMENTS

| | | | | |
|---|---|---|---|---|
| 5,537,548 A | * | 7/1996 | Fin et al. ............... | 709/204 |
| 5,758,110 A | * | 5/1998 | Boss et al. ............. | 715/751 |
| 6,173,315 B1 | * | 1/2001 | Deleeuw ............... | 709/205 |
| 6,240,444 B1 | * | 5/2001 | Fin et al. ............... | 709/205 |
| 6,850,967 B1 | * | 2/2005 | Spencer et al. ........ | 709/205 |
| 7,552,187 B2 | * | 6/2009 | Fuchs .................... | 709/208 |
| 2003/0018725 A1 | * | 1/2003 | Turner et al. .......... | 709/206 |
| 2003/0105819 A1 | * | 6/2003 | Kim et al. ............. | 709/205 |
| 2006/0200520 A1 | * | 9/2006 | Vernon et al. ......... | 709/204 |
| 2008/0155020 A1 | * | 6/2008 | Beauchamp et al. .. | 709/204 |

OTHER PUBLICATIONS

Karneges, XEP-0047: In-Band Bytestreams Nov. 21, 2006.*
Saint-Andre, RFC 3920: Extensible Messaging and Presence Protocol (XMPP): Core, Oct. 2004.*
Hutterer, Input event processing, Oct. 28, 2007.*
Cassidy, Stream tubes, a new generation of tubes, Jun. 5, 2007.*

* cited by examiner

Primary Examiner—Nathan Flynn
Assistant Examiner—James E Conaway
(74) Attorney, Agent, or Firm—Dillon & Yudell LLP

(57) ABSTRACT

A method for utilizing an IM system enables presenters and participants to interact with material in a master-slave configuration. Both the presenter and participants access the material locally on their computers. The material on the participants' computer interacts with the presenter's computer using an existing instant messaging infrastructure. As the presenter interacts with local material, events are broadcast to slave material as instant messages, such that these events are reproduced as interactions.

20 Claims, 10 Drawing Sheets

US 7,792,904 B2

SHARING MATERIAL IN A MASTER-SLAVE CONFIGURATION USING AN INSTANT MESSAGING INFRASTRUCTURE

BACKGROUND OF THE INVENTION

1. Technical Field

The present disclosure relates to the field of computers, and specifically the software that runs on computers. Still more particularly, the present disclosure relates to the field of sharing content via a network.

2. Description of the Related Art

The ubiquitous availability of high speed networks has enabled effective collaboration. Globally distributed teams are able to operate without the need to be co-located. Meetings are routinely conducted in virtual space using web conferences and telephones. One of the cornerstones of such collaborative work is instant messaging (or chat). Federated chat clients that can connect to more than one such infrastructure are also becoming popular.

Virtual meetings are typically conducted using presentations, or show and tell type demonstrations. A presentation allows a presenter to present a document, such as a word processing document, a slide show, a spreadsheet, etc. A show and tell type demonstration allows a presenter to dynamically demonstrate how a particular application functions. In either case, participants join a telephone conference with the presenter. Participants have access to the material of a conference in one of two ways—either via a local copy of the material (common in presentations) or via a web conference (common in show and tell type demonstrations).

In the case of a presentation where all parties are viewing the material locally, the presenter needs to ensure that all participants are viewing the same part of the material. The presenter is forced to constantly call out the part of the material they are currently viewing, making it a very distracting and ineffective process. Even so, the presenter is not guaranteed that all participants continue to be in synch. If a participant temporarily focuses on a different task, they quickly go out of synch and need to interrupt the presenter.

In the case of a show and tell type demonstration, the material (e.g., an application) is accessible only to the presenter. Participants are able to view the material via a web conference wherein the presenters' interactions with the material are broadcast to the participants using a stream of non-interactive graphics. With this approach, participants do not have access to the actual material and are restricted to viewing only those interactions that the presenter chooses. Even in cases where they have access to the material locally (for example, demo of an installed product) they are unable to see the interactions in their local context. This leads to an ineffective learning process for the participants. Further, the broadcast of high resolution graphics to a large audience is ineffective and results in wasted bandwidth. Also, this approach requires infrastructure to enable web conferencing.

SUMMARY OF THE INVENTION

A method for utilizing an IM system enables presenters and participants to interact with material in a master-slave configuration. Both the presenter and participants access the material locally on their computers. The material on the participants' computer interacts with the presenter's computer using an existing instant messaging infrastructure. As the presenter interacts with their local material, events are broadcast to slave material as instant messages, such that these events are reproduced as interactions.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
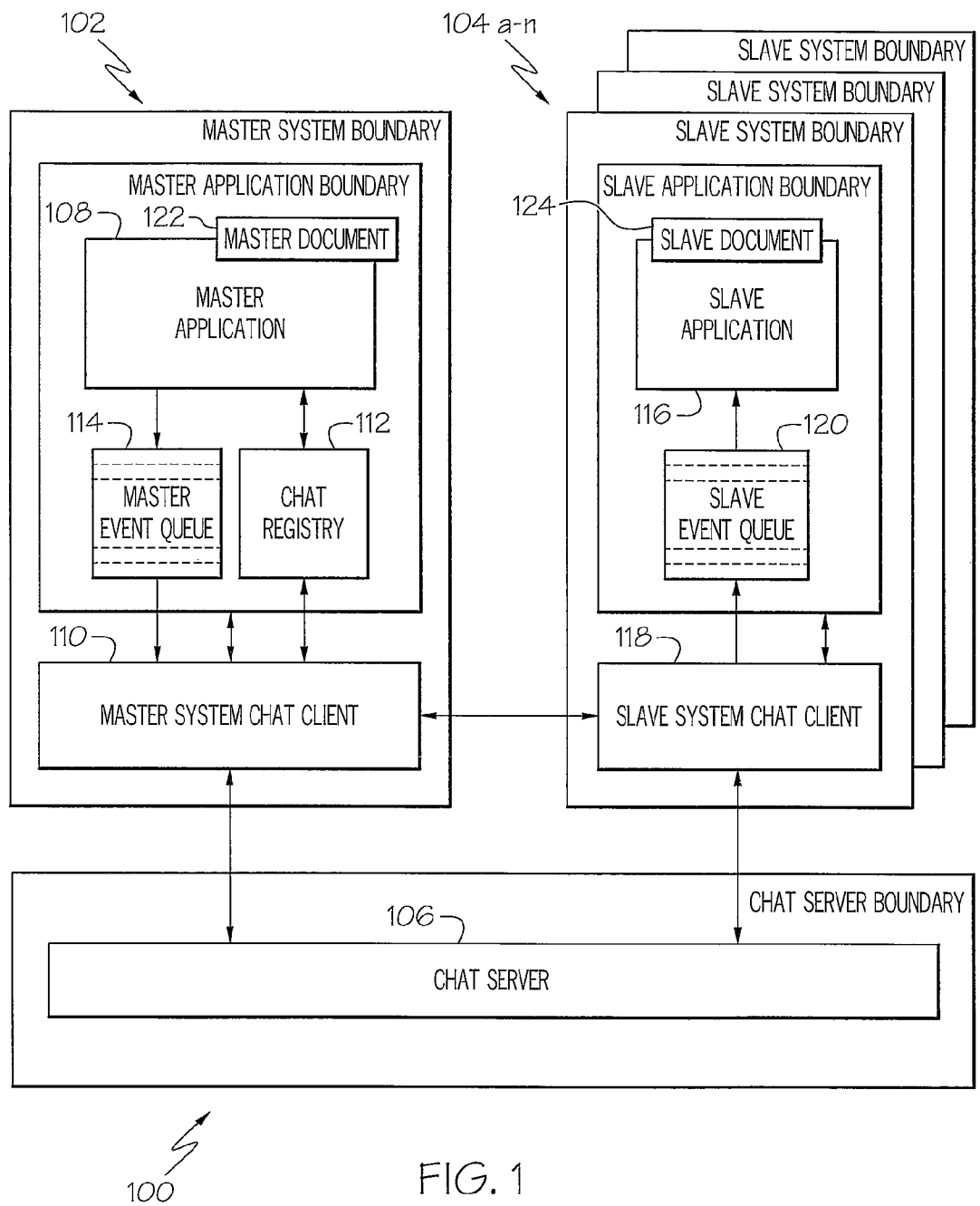
FIG. 1 depicts a high-level system overview of a master/slave computer system.

With reference now to the figures, and in particular to FIG. 1, a high-level exemplary system diagram 100 for implementing the method described below is illustrated. System diagram 100 includes a master system 102 (presenter), one or more slave systems 104a-n (participants) and a chat server 106.

The master system 102 is composed of a master application 108 and a master system chat client 110, and in one embodiment of the present invention, a master document 122 that runs under the master application 108. The master application 108 interacts with a list of registered participants in a chat registry 112. Chat registry 112 is continuously updated as participants (using slave systems 104a-n, where "n" is a variable integer) join or leave a teleconference meeting. Events generated in the master application 108 (and/or the master document 122) are entered into a master event queue 114. The master system chat client 110 reads events at the head of the event queue 114 and transmits them to each participant listed in the chat registry 112.

Each of the slave systems 104a-n consists of a slave application 116 and a slave system chat client 118, as well as a slave document 124, which is a copy (clone) of the master document 122. That is, slave application 116 and/or slave document 124 is a copy, either identical or modified/modifiable, of master application 108 and/or master document 122. Events received by a slave system chat client 118 are entered into slave event queue 120 and are processed by the slave application 116.

In one embodiment, all of the slave systems 104a-n have identical instances of slave application 116, slave event queue 120, slave document 124, and slave system chat client 118 (to provide continuity among all of the slave systems 104a-n), while in another embodiment different slave systems 104*a-n* have different instances of slave application 116, slave event queue 120, slave document 124, and/or slave system chat client 118 (to provide the ability in each of the slave systems 104*a-n* to autonomously modify their slave application 116 and/or operate their own slave system chat client 118).

Figure 2:
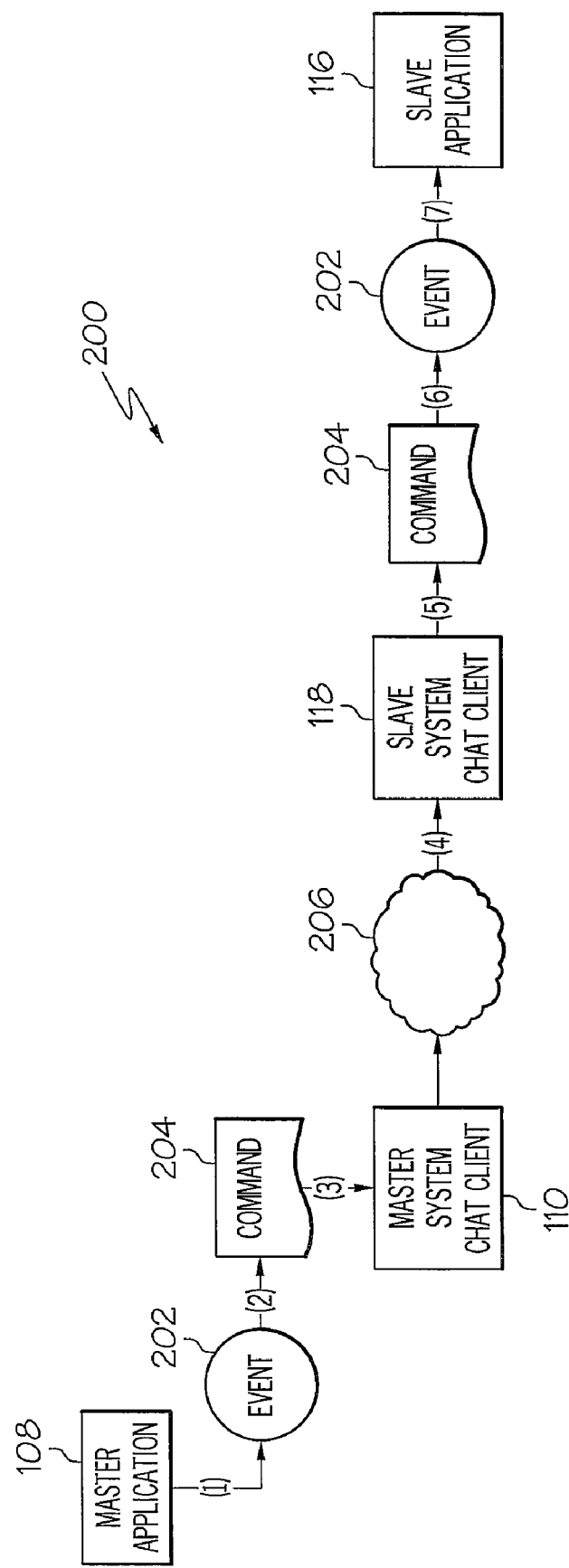
FIG. 2 illustrates a network relationship between a master computer and a slave computer using a chat system.

Referring now to FIG. 2, a high-level schematic 200 depicts and describes how an event 202 generated at a master application 108 is received by one or more slave applications 116. As shown at step 1, event 202 is generated in the master application 108. During the life-cycle of an application (e.g., master application 108), many events are generated but only a subset of these events would need to be transmitted. For example, an event such as "auto save" would be specific to the local context of the master application 108, and thus would not be required to be transmitted. Further, certain user interface activities such as "mouse move" result in hundreds of events that may or may not need to be transmitted from the master application 108 to the slave application 116, depending on the significance of such interface activities. To avoid such event floods from being transmitted, the master application 108 can filter out intermediate (insignificant) events.

In step 2, the significant event 202 (which is relative to the master application's state) is converted into a serialized command 204. To illustrate the need for this conversion, consider that the presenter is using a visual presentation program made up of multiple numbered slides. By pressing the "Page Down" button on his computer, the presenter causes the generation of a "Page Down" event which is easily processed in the presenter's (master) system to "move" down to the next slide (e.g., slide "6" if the current state of the master application 108 is at slide "5"). In the participant's (slave) system, the same event needs to be received as an absolute command independent of any state assumptions. In this example, the event could be serialized into a command such as 'move to slide 6'.

The master system chat client 110 gets the command in step 3 and transmits using the chat infrastructure 206, which may include the chat server 106 shown in FIG. 1. In steps 4 and 5, the slave chat client receives the command and passes it to the slave application. In step 7, the command is reconstituted into an event that is processed by the application.

Figure 3A:
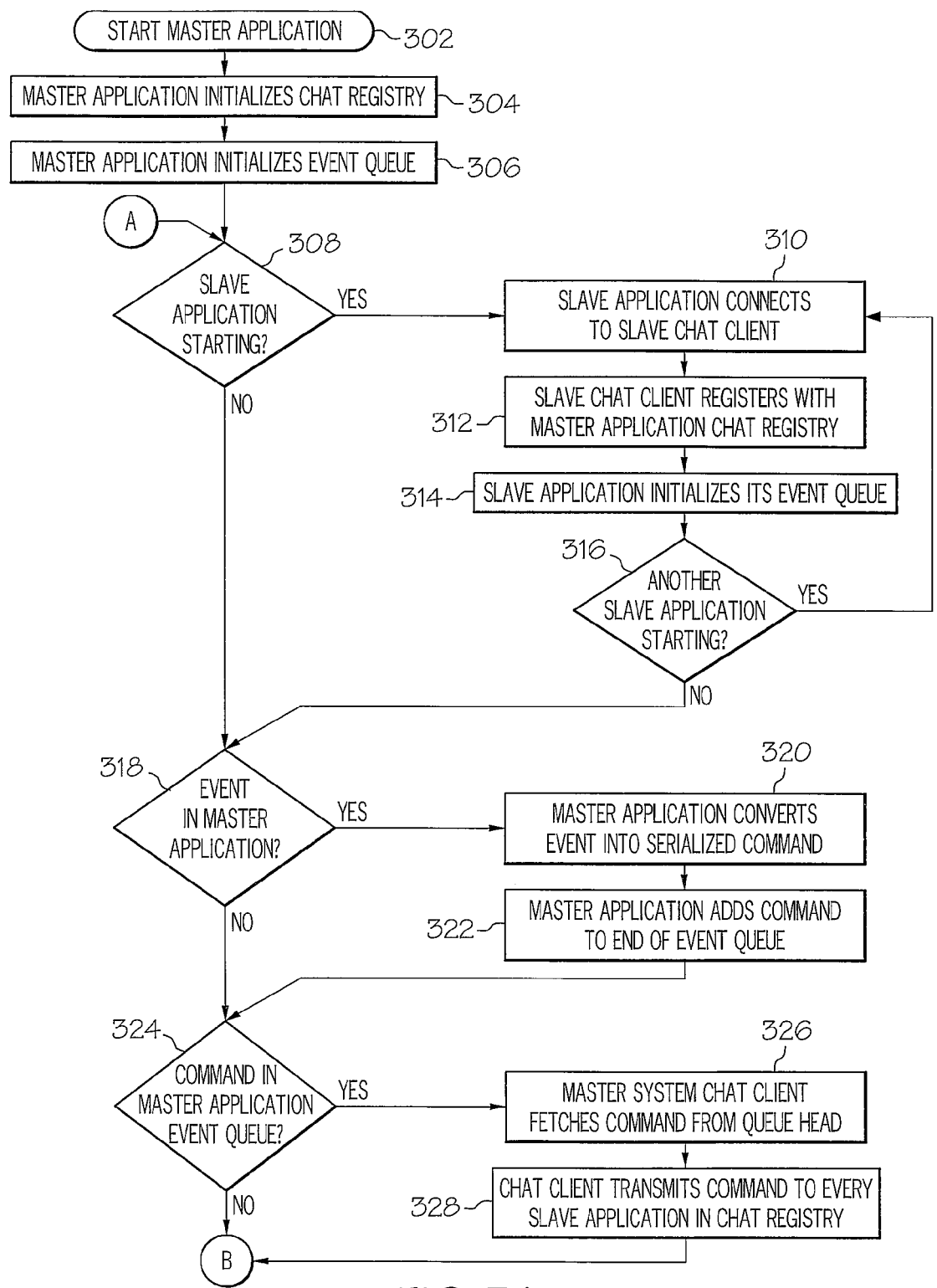
FIGS. 3A-B are a flow-chart of exemplary steps taken to utilize a chat system to communicate change events in an application program.
Figure 3B:
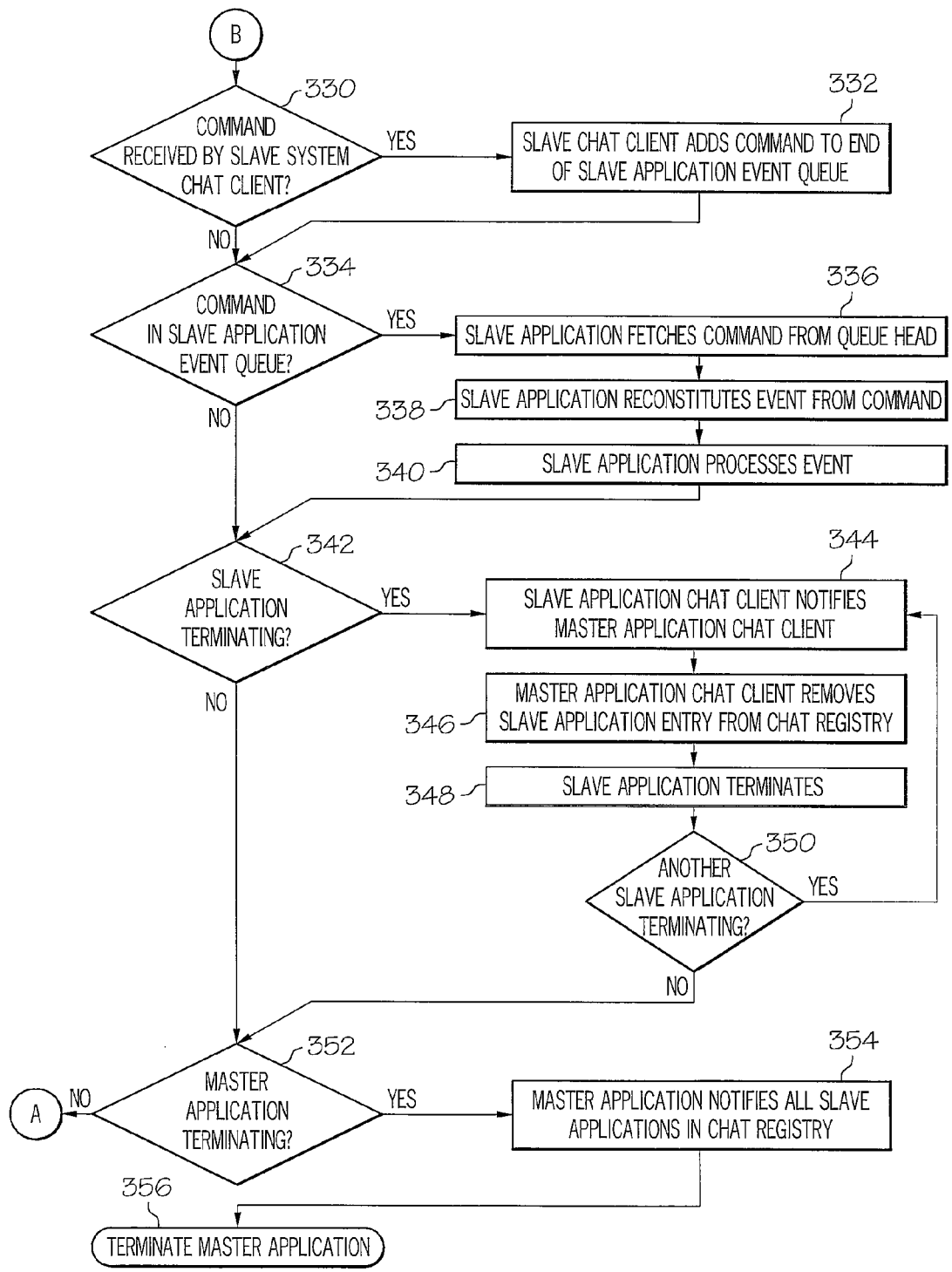

With reference now to FIGS. 3A-B, a high-level flow-chart of steps taken in an exemplary embodiment of a process to share applications in a master-slave relationship is presented. At initiator block 302, a master application is started at a master (presenter) computer. The master application initializes the chat registry (block 304) to initialize which slaves (participants) are to receive the presentation created by the master application (i.e., create a slave application 116, which is a clone of the master application 108 shown in FIG. 1). The master application then initializes the master event queue (block 306), in order to record significant events of the master application. Note that this initialization step includes defining what a "significant event" is, in order to avoid sending insignificant events (e.g., auto-saves, screen refreshes, inconsequential mouse movements, etc.) to the master event queue.

If a slave application is starting (query block 308), the slave application registers with the master via the slave chat client (block 310) to connect with the master. In one embodiment, the slave application starts by 1) downloading a clone (copy) of the master application and 2) executing the cloned copy of the master application. After connecting with the master, the slave application initializes its event queue (block 312). If another slave application is starting (query block 316), the method returns to block 310. Otherwise, the method proceeds to query block 318.

As described at query block 318, if an event occurs in the master application and the application decides to transmit the event, the event is serialized (block 320) and stored in the master application's event queue (block 322). Otherwise, the method proceeds to query block 324.

If the event queue is not empty in query block 324, the chat client reads from the head of the queue by having the master event queue fetch an event from the master event queue (block 326) and transmitting that event to the end of the slave event queue (block 322) using the master system chat client 110, chat server 106 and slave system chat client 118 shown in FIG. 1. Otherwise, the method proceeds to query block 330 shown in FIG. 4.

As described at query block 330, if a command is received by a slave system chat client, the slave system chat client proceeds to add the command to the end of the slave application event queue, as described in block 332. Otherwise, the method proceeds to block 334.

If a slave application event queue is not empty in the step described in block 334, then the slave application fetches an event command from the slave queue head (block 336), that event command is reconstituted from its serialized form (block 338), and the reconstituted command is executed by the slave application (e.g., 116 shown in FIG. 1), as described in block 340. Otherwise, the method proceeds to query block 342.

As described at query block 342, if a slave application is terminating, it is necessary to update the master system's registry. In this case, the process proceeds to block 344, which describes the step of the slave application chat client notifying the master application chat client that the slave application is terminating. The master application chat client then removes the slave application entry from the chat registry (e.g., 112 shown in FIG. 1), and the slave application (which is a clone of the master application) terminates (block 348). If another slave application is terminating (query block 350), the method returns to block 344. Otherwise, the method proceeds to the step described in query block 352.

As illustrated at query block 352, if the master application is terminating, all registered slave applications are notified (block 354) before terminating (termination block 356). Otherwise, the method reverts back to the step described in block 308 shown in FIG. 3.

Figure 4:
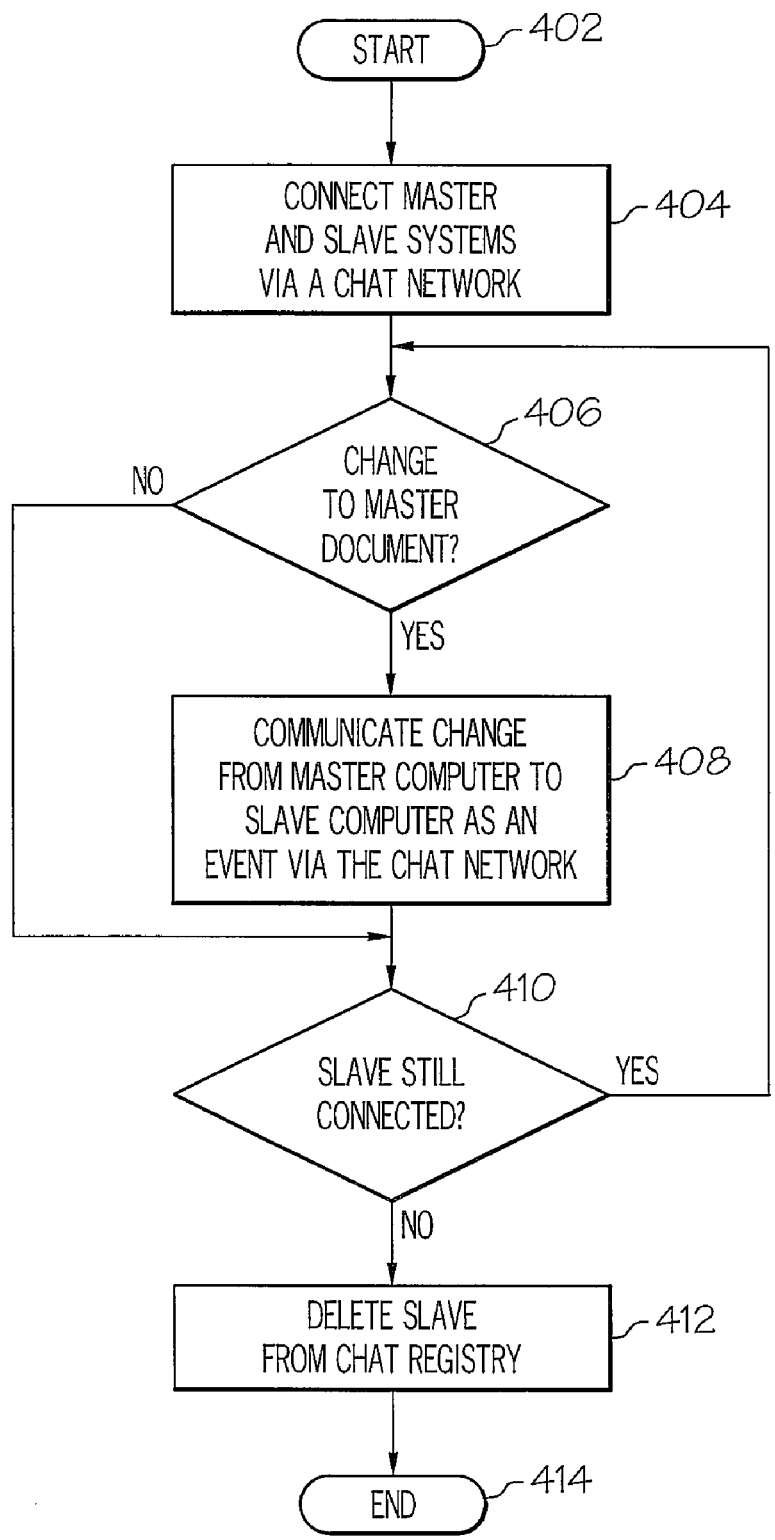
FIG. 4 is a flow-chart of exemplary steps taken to utilize a chat system to communicate change events to a document in an application program.

The flow-chart in FIGS. 3A-B have been focused on steps taken to allow a presenter to share events taken during a show and tell presentation, such as when teaching one or more participants how to manipulate a particular application. As stated above, the process described herein for communicating events via a chat system can also be utilized in a presentation environment, in which events in a presentation are communicated via a chat server to one or more participants. Referring now to FIG. 4, a high-level flow-chart describing the sharing of events in a master's presentation is presented. After initiator block 402, a master system (e.g., master system 102 shown in FIG. 1) is connected to one or more slave systems (e.g., slave systems 104*a-n* shown in FIG. 1) via a chat server (e.g., chat server 106 shown in FIG. 1), as described in block 404. A query (query block 406) is made to determine if a change occurs to a master document (e.g., master document 122 shown in FIG. 1). This event change is anything that changes the content and/or appearance of the master document. For example, an event may be deleting or italicizing a passage in a word processing document, switching to a new slide in a slide show presentation, switching to a new sheet in a spreadsheet, etc. As with the show and tell process described in FIGS. 3A-B, note that only the change events, and not the entire document (and/or application) are transmitted from the presenter to the participant(s), thus conserving bandwidth between the master and slave systems.

If such a change event occurs, then the event is transmitted from the master system to the slave system via the chat network (block 408). This results in the slave document being changed accordingly, in a manner similar to that described in FIGS. 3A-B for the show and tell presentation. If a slave system is still connected to the master system in the chat session (query block 410), then that slave system continues to monitor for changes to the document. However, if the slave system has disconnected from the chat session, then that slave system is deleted from the chat registry in the master system (block 412). Each slave system is deleted from the chat registry as they sign off the chat session until the process ends at terminator block 414.

Figure 5:
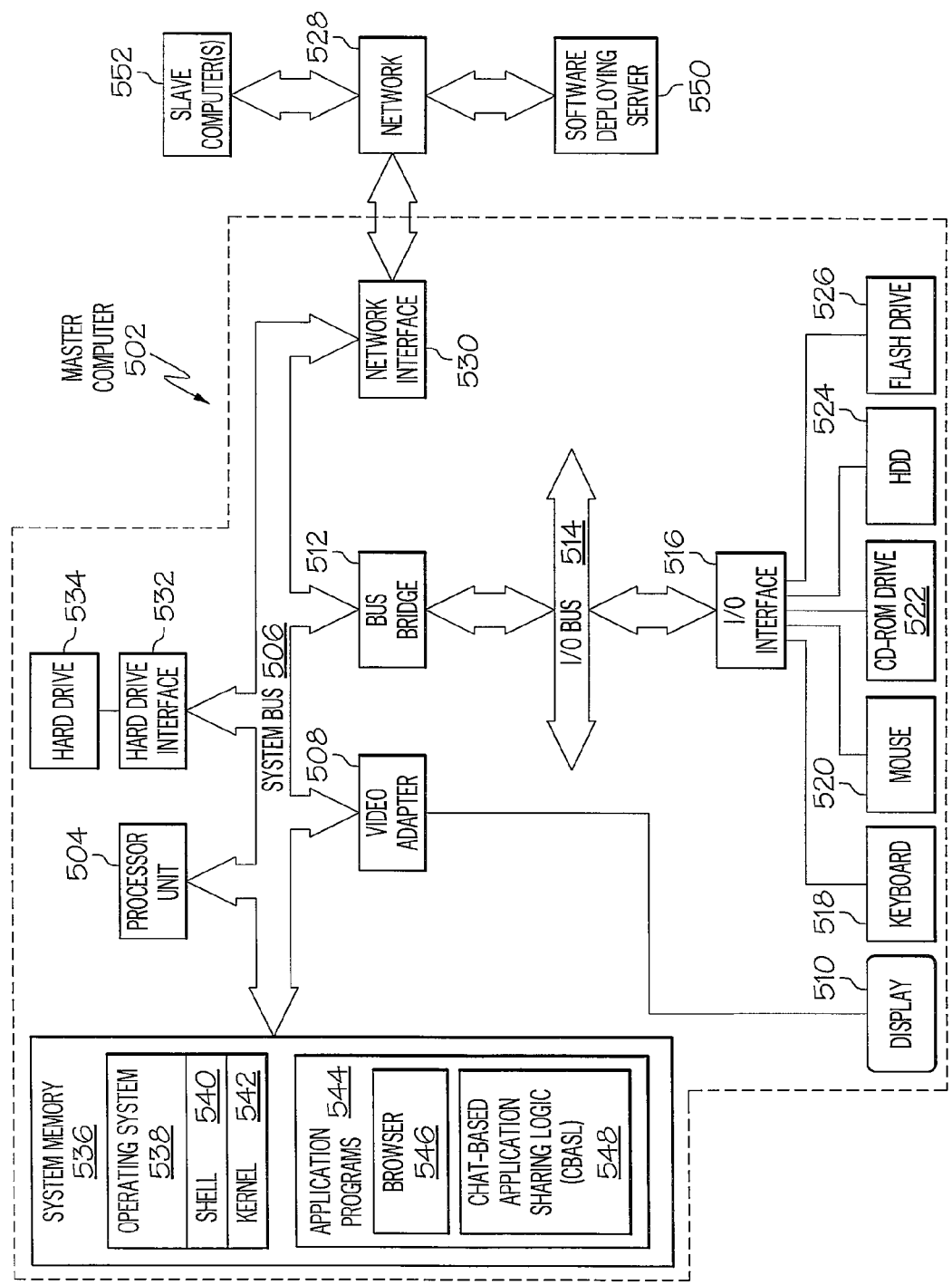
FIG. 5 depicts an exemplary computer in which the present invention may be utilized.

With reference now to FIG. 5, there is depicted a block diagram of an exemplary master computer 502, in which the present invention may be utilized. Note that some or all of the exemplary architecture shown for master computer 502 may be utilized by software deploying server 550 and slave computer(s) 552. Master computer 502 is utilized as an implementation of master system 102 shown in FIG. 1, while slave computer(s) is utilized as an implementation of slave systems 104a-n depicted in FIG. 1.

Master computer 502 includes a processor unit 504 that is coupled to a system bus 506. A video adapter 508, which drives/supports a display 510, is also coupled to system bus 506. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a Hard Disk Drive (HDD) 524, and a Flash Drive 526. The format of the ports connected to I/O interface 516 may be any known to those skilled in the art of computer architecture, including but not limited to Universal Serial Bus (USB) ports.

Master computer 502 is able to communicate with a software deploying server 550 via a network 528 using a network interface 530, which is coupled to system bus 506. Network 528 may be an external network such as the Internet, or an internal network such as an Ethernet or a Virtual Private Network (VPN). Similarly, the slave computer(s) are able to communicate with master computer 502 via network 528.

A hard drive interface 532 is also coupled to system bus 506. Hard drive interface 532 interfaces with a hard drive 534. In a preferred embodiment, hard drive 534 populates a system memory 536, which is also coupled to system bus 506. System memory is defined as a lowest level of volatile memory in master computer 502. This volatile memory includes additional higher levels of volatile memory (not shown), including, but not limited to, cache memory, registers and buffers. Data that populates system memory 536 includes master computer 502's operating system (OS) 538 and application programs 544.

OS 538 includes a shell 540, for providing transparent user access to resources such as application programs 544. Generally, shell 540 is a program that provides an interpreter and an interface between the user and the operating system. More specifically, shell 540 executes commands that are entered into a command line user interface or from a file. Thus, shell 540, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 542) for processing. Note that while shell 540 is a text-based, line-oriented user interface, the present invention will equally well support other user interface modes, such as graphical, voice, gestural, etc.

As depicted, OS 538 also includes kernel 542, which includes lower levels of functionality for OS 538, including providing essential services required by other parts of OS 538 and application programs 544, including memory management, process and task management, disk management, and mouse and keyboard management.

Application programs 544 include a renderer, shown in exemplary manner as a browser 546. Browser 546 includes program modules and instructions enabling a World Wide Web (WWW) client (i.e., master computer 502) to send and receive network messages to the Internet using HyperText Transfer Protocol (HTTP) messaging, thus enabling communication with software deploying server 550 and other described computer systems.

Application programs 544 in master computer 502's system memory (as well as software deploying server 550's system memory) also include a Chat-Based Application Sharing Logic (CBASL) 548. CBASL 548 includes code for implementing the processes described in FIGS. 1-4. In one embodiment, master computer 502 is able to download CBASL 548 from software deploying server 550, including in an on-demand basis.

The hardware elements depicted in master computer 502 are not intended to be exhaustive, but rather are representative to highlight essential components required by the present invention. For instance, master computer 502 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 550 performs all of the functions associated with the present invention (including execution of CBASL 548), thus freeing master computer 502 from having to use its own internal computing resources to execute CBASL 548.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of CBASL 548, are performed by service provider server 550. Alternatively, CBASL 548 and the method described herein, and in particular as shown and described in FIGS. 1-4, can be deployed as a process software from service provider server 550 to master computer 502. Still more particularly, process software for the method so described may be deployed to service provider server 550 by another service provider server (not shown).

Figure 6A:
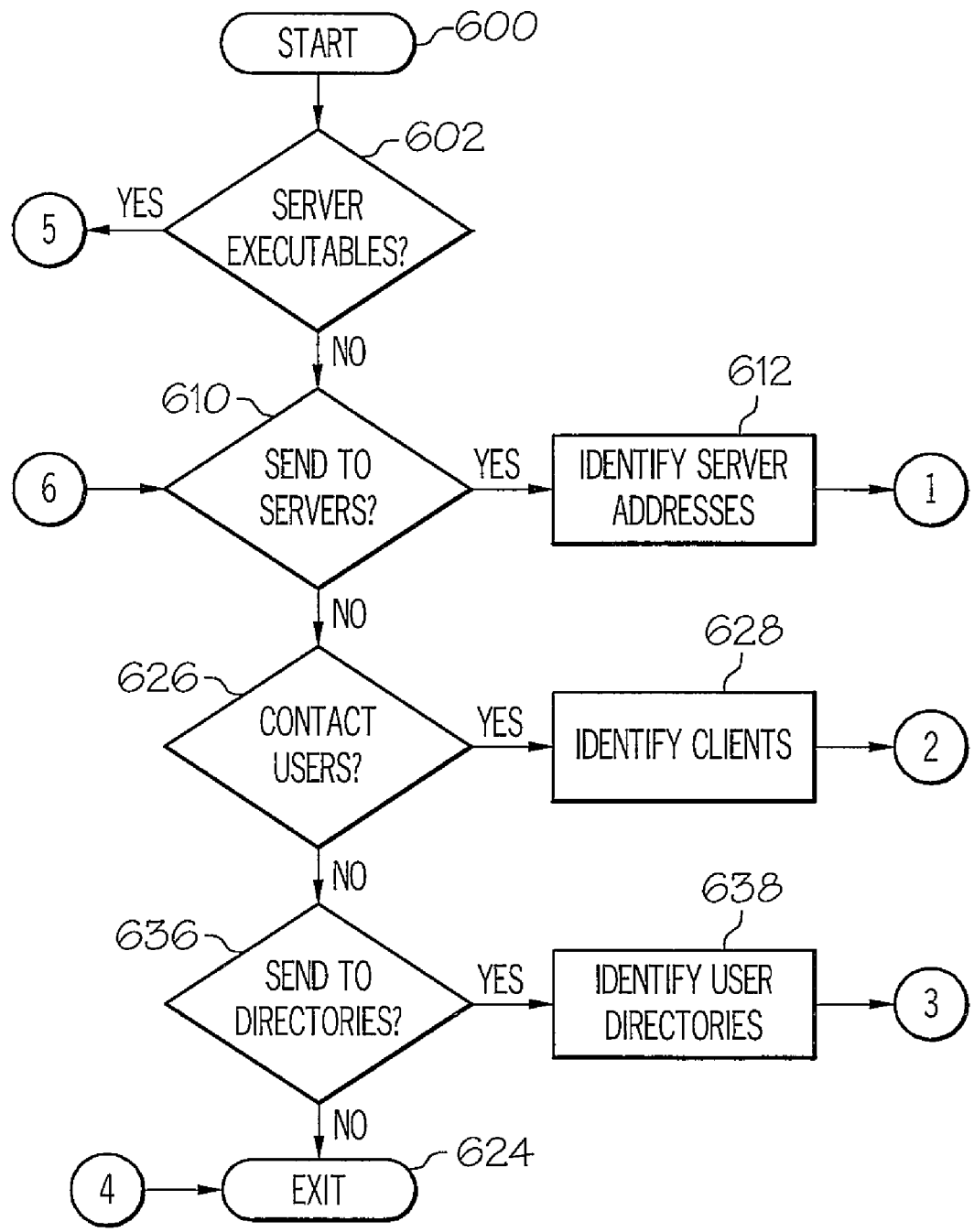
FIGS. 6A-B are flow-charts showing steps taken to deploy software capable of executing the environment and steps described in FIGS. 1 and 3-4.
Figure 6B:
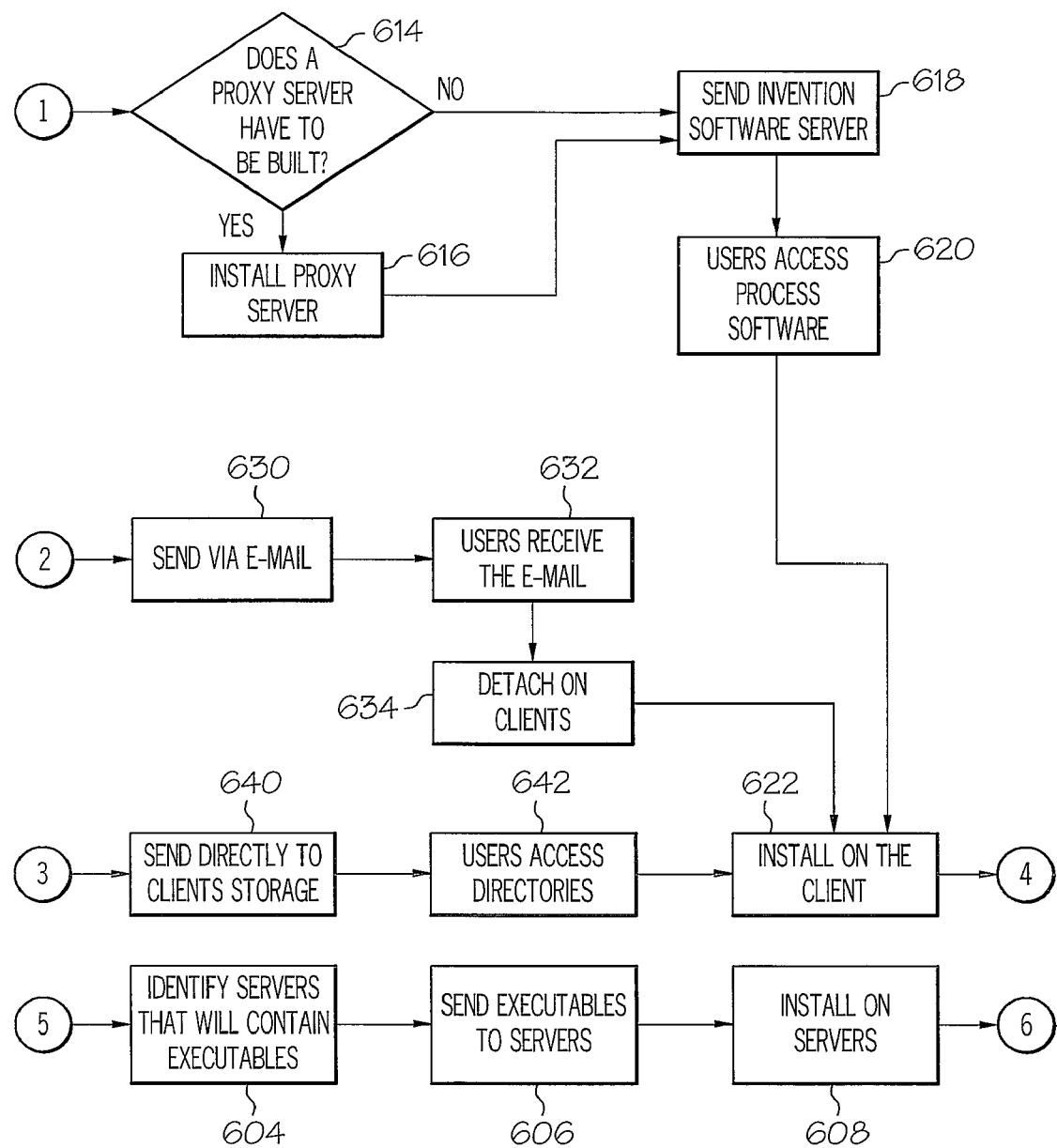

Referring then to FIGS. 6A-B, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users, via their computers, then access the process software on the servers and copy to their computers file systems (block 620). Another embodiment is to have the servers automatically copy the process software to each client and then run the installation program for the process software at each computer. The user executes the program that installs the process software on his computer (block 622) then exits the process (terminator block 624).

In query step 626, a determination is made whether the process software is to be deployed by sending the process software to users via e-mail. The set of users where the process software will be deployed are identified together with the addresses of the user computers (block 628). The process software is sent via e-mail to each of the users' computers (block 630). The users then receive the e-mail (block 632) and then detach the process software from the e-mail to a directory on their computers (block 634). The user executes the program that installs the process software on his computer (block 622) then exits the process (terminator block 624).

Lastly a determination is made as to whether the process software will be sent directly to user directories on their computers (query block 636). If so, the user directories are identified (block 638). The process software is transferred directly to the user's computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642).

The user executes the program that installs the process software on his computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e., the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
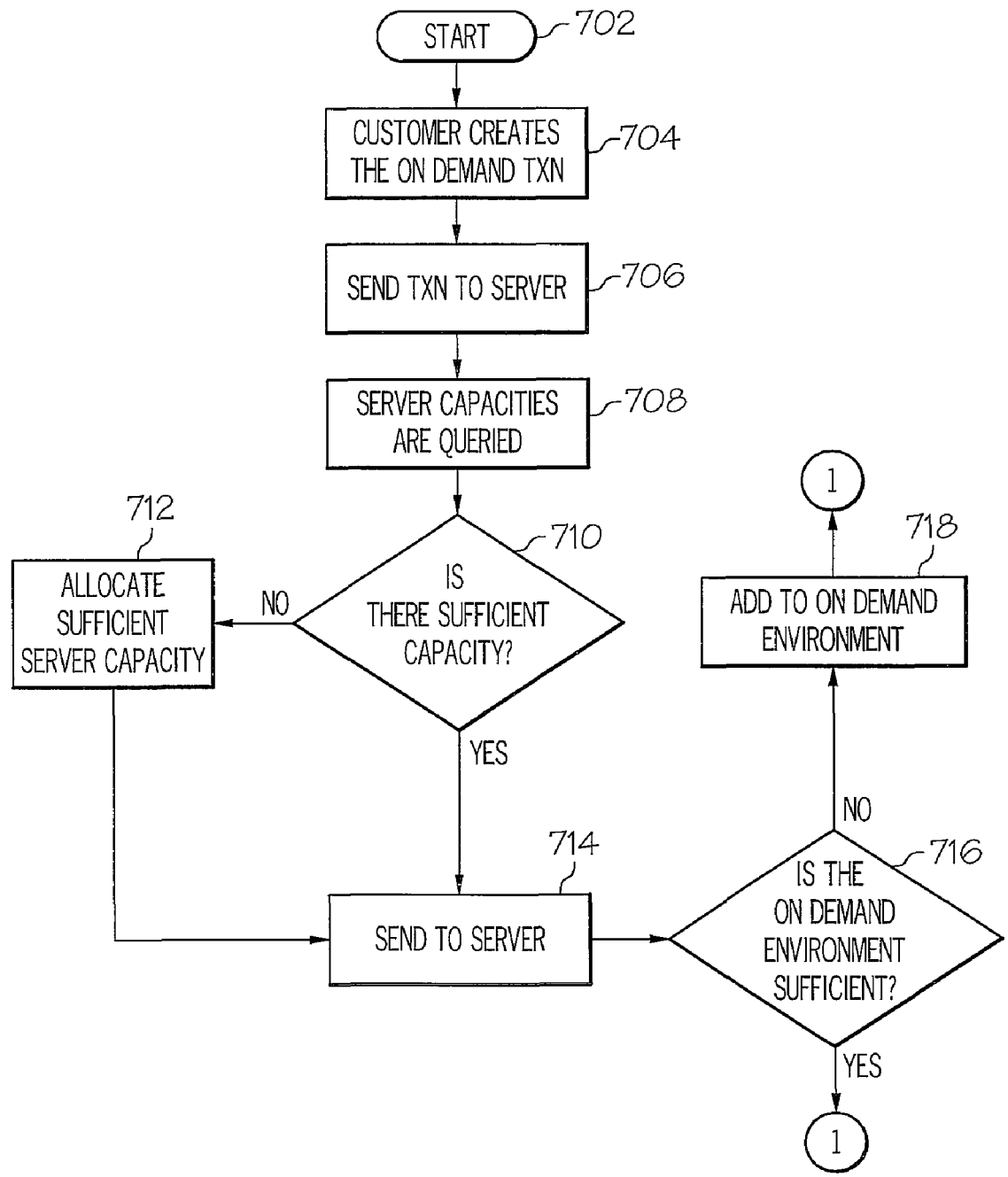
FIGS. 7A-B are flow-charts showing steps taken to execute the environment and steps shown in FIGS. 1 and 3-4 using an on-demand service provider.
Figure 7B:
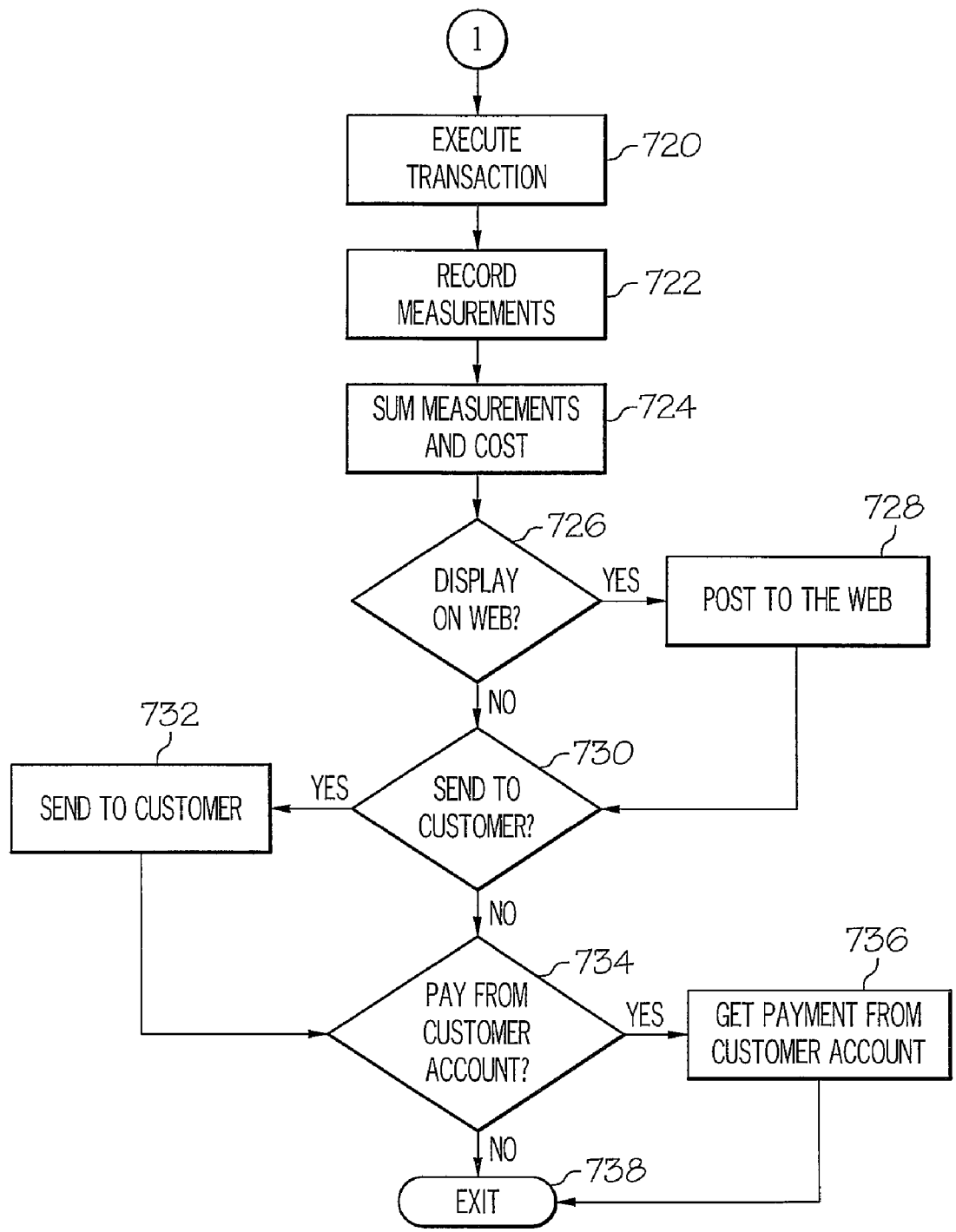

With reference now to FIGS. 7A-B, initiator block 702 begins the On Demand process. A transaction is created than contains the unique customer identification, the requested service type and any service parameters that further specify the type of service (block 704). The transaction is then sent to the main server (block 706). In an On Demand environment the main server can initially be the only server; then as capacity is consumed other servers are added to the On Demand environment.

The server central processing unit (CPU) capacities in the On Demand environment are queried (block 708). The CPU requirement of the transaction is estimated, then the server's available CPU capacity in the On Demand environment are compared to the transaction CPU requirement to see if there is sufficient CPU available capacity in any server to process the transaction (query block 710). If there is not sufficient server CPU available capacity, then additional server CPU capacity is allocated to process the transaction (block 712). If there was already sufficient available CPU capacity then the transaction is sent to a selected server (block 714).

Before executing the transaction, a check is made of the remaining On Demand environment to determine if the environment has sufficient available capacity for processing the transaction. This environment capacity consists of such things as but not limited to network bandwidth, processor memory, storage etc. (block 716). If there is not sufficient available capacity, then capacity will be added to the On Demand environment (block 718). Next the required software to process the transaction is accessed, loaded into memory, and the transaction is executed (block 720).

The usage measurements are recorded (block 722). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 724).

If the customer has requested that the On Demand costs be posted to a web site (query block 726), then they are posted (block 728). If the customer has requested that the On Demand costs be sent via e-mail to a customer address (query block 730), then these costs are sent to the customer (block 732). If the customer has requested that the On Demand costs be paid directly from a customer account (query block 734), then payment is received directly from the customer account (block 736). The On Demand process is then exited at terminator block 738.

As described herein, a novel method is developed that enables presenters and participants to interact with the material in a master-slave configuration. Both the presenter and participants access the material locally on their computers using an appropriate application. The application on the participants' computer (referred to as the slave application) connects to the application on the presenter's computer (referred to as the master application) using an existing common messaging infrastructure. As the presenter interacts with the master application, events are broadcast to slave applications as instant messages where these events are reproduced as interactions.

The presently described method and system presents several new and unexpected (non-obvious) advantages over existing approaches, including, but not limited to:

Participants are guaranteed to be always in synch with the presenter;

Presenters are able to access and interact with any part of the material, and these interactions are actively transmitted to participants without any specific guidance from the presenter; this enables the presenter to be more productive by focusing on the contents of the material;

Since slave applications are executed locally on their computer, participants are able to view the material in their local context thus leading to a more effective learning experience;

Broadcast of low bandwidth event messages results in optimized use of the network, especially if participants are using lower bandwidth networks such as cell phone networks; and The approach can be equally applied to presentations as well as show and tell type demonstrations; further this approach takes advantage of an existing instant messaging infrastructure.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. In a data processing system having a processor and at least one application executing on the processor, including Chat-Based Application Sharing Logic (CBASL), a method of using an instant messaging (IM) infrastructure in a master-slave configuration to transmit events that alter the visual state of material, the method comprising:

starting a master application in a master system;

connecting, via a chat server, the master system to one or more registered slave systems;

in response to the master application detecting an event that alters the visual state of the material in the master system, converting the event into a serialized command that is transmittable by the chat server;

adding the serialized command to a master event queue in the master system;

transmitting the serialized command from the master event queue in the master system to a slave event queue in one or more of the registered slave systems that are authorized and are running a slave application, wherein the slave application is a copy of the master application and the transmitting the serialized command comprises transmitting only change events at the master application to the slave applications, wherein an entire document and/or application is not transmitted from the master system to the slave systems;

fetching, in each registered slave system, the serialized command from the slave event queue within each registered authorized slave system;

reconstituting, in each registered slave system, the serialized command into an executable event command; and executing the executable event command in each of the slave applications in the registered slave systems, wherein executing the executable event command alters a visual state of a copy of the material in the slave system.

2. The method of claim 1, further comprising:

determining, at the master application in the master system, if the event is significant;

in response to the master application in the master system determining that the event is insignificant, blocking one or both of the converting of the event into the serialized command and the adding of the serialized command to the master event queue;

when the master application determines that the event is a significant event, the master application performing the functions of:

serializing the significant event into a command which can be executed on the slave system to change the slave system application in substantially the same way the master application is changed;

placing the command into the master application's event queue; the master system chat client obtaining the command from the event queue; and transmitting the command using the chat infrastructure, wherein the command is received at the chat client of each registered slave system and is subsequently passed by the slave's chat client to the slave application;

wherein, when the significant event is one of a page up or a page down event generated on a visual presentation program made up of multiple numbered slides, the event is processed in the master system to "move" up or down to a next slide.

3. The method of claim 1, further comprising:

determining, at the master application in the master system, if the event queue is empty; and if the event queue is not empty, enabling the chat client of the master system to perform the functions of:

reading from the head of the event queue;

fetching an event from the master event queue; and transmitting that fetched event to one or more registered slave systems of each participant listed in the chat registry and having a registered chat client, wherein the fetched event is placed at the end of a respective one or more slave event queues.

4. The method of claim 1, further comprising:

initializing a chat registry in the master system, wherein the chat registry registers an identity of authorized users who are authorized to participate in a virtual meeting in which the material is interactively shared between the master system and the registered slave systems; and interactively sharing the material between the master system and the registered slave systems.

5. The method of claim 1, further comprising:

receiving at the master chat client a registration notification from a slave chat client of a slave application that is attempting to register with the master application;

on completion of a registration of the slave application, enabling the slave application to perform the following functions at the master application: (1) downloading a clone (copy) of the master application (2) executing the cloned copy of the master application on the slave device; and (3) initializing an event queue;

receiving a notification that a slave application is terminating;

responsive to receipt of the notification, updating the master system's chat registry to remove/delete the slave application.

6. The method of claim 1, wherein:
the material is one of a master application and a master document; and
when the material is the master application, the event alters a visual state of the master application; and
when the material is a master document that operates under the master application, the event alters a visual state of the master document, and wherein the executable event command alters a visual state of a slave document that is running in one of the slave systems, wherein the slave document is a cloned copy of the master document.

7. A system comprising:
a processor;
a data bus coupled to the processor;
a memory coupled to the data bus; and
a computer-usable medium embodying computer program code, the computer program code comprising instructions executable by the processor and configured for using an instant messaging (IM) infrastructure in a master-slave configuration to transmit changes to a visual appearance of material by performing the steps of:
starting a master application in a master system;
connecting, via a chat server, the master system to one or more registered slave systems;
in response to the master application detecting an event that changes a visual appearance of the material in the master system, converting the event into a serialized command that is transmittable by the chat server;
adding the serialized command to a master event queue in the master system;
transmitting the serialized command from the master event queue in the master system to a slave event queue in one or more of the registered slave systems that are authorized and are running a slave application, wherein the slave application is a copy of the master application and the transmitting the serialized command comprises transmitting only change events at the master application to the slave applications, wherein an entire document and/or application is not transmitted from the master system to the slave systems;
fetching, in each registered slave system, the serialized command from the slave event queue within each registered authorized slave system;
reconstituting, in each registered slave system, the serialized command into an executable event command; and
executing the executable event command in each of the slave applications in the registered slave systems, wherein executing the executable event command changes the visual appearance of a copy of the material in the slave system.

8. The system of claim 7, wherein the instructions are further configured for:
determining, at the master application in the master system, if the event is insignificant; and
in response to the master application in the master system determining that the event is insignificant, blocking the converting of the event into the serialized command.

9. The system of claim 7, wherein the instructions are further configured for:
determining, at the master system, whether the event is insignificant;
in response to the master system determining that the event is insignificant, blocking the converting of the event into the serialized command.

10. The system of claim 7, wherein the instructions are further configured for:
initializing a chat registry in the master system, wherein the chat registry registers an identity of authorized users who are authorized to participate in a virtual meeting in which the material is interactively shared between the master system and the registered slave systems.

11. The system of claim 7, further comprising instructions configured for:
receiving at the master chat client a registration notification from a slave chat client of a slave application that is attempting to register with the master application;
on completion of a registration of the slave application, enabling the slave application to perform the following functions at the master application: (1) downloading a clone (copy) of the master application (2) executing the cloned copy of the master application on the slave device; and (3) initializing an event queue;
receiving a notification that a slave application is terminating;
responsive to receipt of the notification, updating the master system's chat registry to remove/delete the slave application.

12. The system of claim 7, wherein:
the material is one of a master application and a master document; and
when the material is the master application, the event alters a visual state of the master application; and
when the material is a master document that operates under the master application, the event changes a visual appearance of the master document, and wherein the executable event command changes a visual appearance of a slave document that is running in one of the slave systems, wherein the slave document is a cloned copy of the master document.

13. A non-transitory computer-readable storage medium embodying computer program code, the computer program code comprising instructions executable by the processor and configured for using an instant messaging (IM) infrastructure in a master-slave configuration to transmit events that alter a state of material by performing the steps of:
starting a master application in a master system;
connecting, via a chat server, the master system to one or more registered slave systems;
in response to the master application detecting an event that alters the visual state of the material in the master system, converting the event into a serialized command that is transmittable by the chat server;
adding the serialized command to a master event queue in the master system;
transmitting the serialized command from the master event queue in the master system to a slave event queue in one or more of the registered slave systems that are authorized and are running a slave application, wherein the slave application is a copy of the master application and the transmitting the serialized command comprises transmitting only change events at the master application to the slave applications, wherein an entire document and/or application is not transmitted from the master system to the slave systems;
fetching, in each registered slave system, the serialized command from the slave event queue within each registered authorized slave system;
reconstituting, in each registered slave system, the serialized command into an executable event command; and
executing the executable event command in each of the slave applications in the registered slave systems, wherein executing the executable event command alters a visual state of a copy of the material in the slave system.

14. The non-transitory computer-readable storage medium of claim 13, wherein the instructions are further configured for:
   determining, at the master application in the master system, if the event is insignificant; and
   in response to the master application in the master system determining that the event is insignificant, blocking the adding of the serialized command to the master event queue.

15. The non-transitory computer-readable storage medium of claim 13, wherein the instructions are further configured for:
   determining, at the master application in the master system, if the event is insignificant; and
   in response to the master application in the master system determining that the event is insignificant, blocking the converting of the event into the serialized command.

16. The non-transitory computer-readable storage medium of claim 13, wherein the instructions are further configured for:
   initializing a chat registry in the master system, wherein the chat registry registers an identity of authorized users who are authorized to participate in a virtual meeting in which the material is interactively shared between the master system and the registered slave systems.

17. The non-transitory computer-readable storage medium of claim 13, further comprising instructions configured for:
   receiving at the master chat client a registration notification from a slave chat client of a slave application that is attempting to register with the master application;
   on completion of a registration of the slave application, enabling the slave application to perform the following functions at the master application: (1) downloading a clone (copy) of the master application (2) executing the cloned copy of the master application on the slave device; and (3) initializing an event queue;
   receiving a notification that a slave application is terminating;
   responsive to receipt of the notification, updating the master system's chat registry to remove/delete the slave application.

18. The non-transitory computer-readable storage medium of claim 13, wherein:
   the material is one of a master application and a master document; and
   when the material is the master application, the event alters a visual state of the master application; and
   when the material is a master document that operates under the master application, the event alters a state of the master document, and wherein the executable event command changes a state of a slave document that is running in one of the slave systems, wherein the slave document is a cloned copy of the master document.

19. The non-transitory computer-readable storage medium of claim 13, wherein the computer-usable medium is a component of a remote server, and wherein the computer executable instructions are deployable to a supervisory computer from the remote server.

20. The non-transitory computer-readable storage medium of claim 13, wherein the computer executable instructions are capable of being provided by a service provider to a customer on an on-demand basis.

* * * * *